US007165033B1

(12) United States Patent
Liberman (10) Patent No.: US 7,165,033 B1
(45) Date of Patent: Jan. 16, 2007

(54) APPARATUS AND METHODS FOR DETECTING EMOTIONS IN THE HUMAN VOICE

(76) Inventor: Amir Liberman, P.O. Box 1183, Tzoran (IL)

( * ) Notice: Subject to any disclaimer, the term of this patent is extended or adjusted under 35 U.S.C. 154(b) by 0 days.

(21) Appl. No.: 09/958,015

(22) PCT Filed: Jul. 11, 2000

(86) PCT No.: PCT/IL00/00216

§ 371 (c)(1),
(2), (4) Date: Jan. 7, 2002

(87) PCT Pub. No.: WO00/62279

PCT Pub. Date: Oct. 19, 2000

(30) Foreign Application Priority Data

Apr. 12, 1999 (IL) .................................. 129399

(51) Int. Cl.
*G10L 19/02* (2006.01)
(52) U.S. Cl. ........................ 704/270; 704/206
(58) Field of Classification Search ............. 704/270, 704/275
See application file for complete search history.

(56) References Cited

U.S. PATENT DOCUMENTS

| 1,384,721 | A | | 7/1921 | Johnson |
| 3,855,416 | A | | 12/1974 | Fuller |
| 3,855,417 | A | | 12/1974 | Fuller |
| 3,855,418 | A | | 12/1974 | Fuller |
| 3,971,034 | A | * | 7/1976 | Bell et al. .................. 346/33 R |
| 4,093,821 | A | * | 6/1978 | Williamson .................. 704/207 |
| 5,559,927 | A | * | 9/1996 | Clynes ........................ 704/258 |
| 6,151,571 | A | * | 11/2000 | Pertrushin ................... 704/209 |
| 6,463,415 | B1 | * | 10/2002 | St. John ...................... 704/273 |
| 6,480,826 | B1 | * | 11/2002 | Pertrushin ................... 704/270 |

FOREIGN PATENT DOCUMENTS

| DE | 29914964 | 11/1999 |
| EP | 0 664 537 B1 | 9/2000 |
| WO | 95 20216 | 7/1995 |
| WO | WO 97/01984 | 1/1997 |
| WO | 99 22364 | 5/1999 |
| WO | 99 31653 | 6/1999 |

* cited by examiner

*Primary Examiner*—Abul K. Azad
(74) *Attorney, Agent, or Firm*—Ryndak & Suri LLP (57) ABSTRACT

The present invention relates to an apparatus for monitoring emotional states of an individual by using a voice analysis of said individual. The apparatus comprises a voice analyzer operative to input speech specimens, comprising an analog to digital converter operative to perform a digitization process of analog audio vocal segments, and a general emotion reporter, operative to produce an indication of any kind for the monitored general emotions. According to preferred embodiment of the present invention, the speech specimens are provided over the telephone to the voice analyzer and the report of the subject's emotional state includes a "love detection" report based on the individual's sub-conscious emotional state.

18 Claims, 9 Drawing Sheets

A Block Diagram of a preferred embodiment of the present invention.

A Block Diagram of a preferred embodiment of the present invention.

Figure 8

Fig. 9A – The Software preferred embodiment during design-time

Fig. 9B – The Software preferred embodiment during Run-Time (At work)

APPARATUS AND METHODS FOR DETECTING EMOTIONS IN THE HUMAN VOICE

FIELD OF INVENTION

The present invention relates to apparatus and methods for detecting emotions and a global emotion state in the human voice.

BACKGROUND OF THE INVENTION

Published PCT Application WO 97/01984 (PCT/IL96/0027) describes a method for effecting biofeedback regulation of at least one physiological variable characteristic of a subject's emotional state, including the steps of monitoring at least one speech parameter characteristic of the subject emotional state so as to produce an indication signal, and using the indication signal to provide the subject with an indication of the at least one physiological variable. A system permits the method to be carried out in a stand-alone mode or via telephone line in which case the indication signal may be derived at a location remote from the subject. Information related to the subject's emotional state can be conveyed vocally to a remote party or textually through the Internet, and then processed as required.

Published PCT Application WO 95/20216 (PCT/US95/00493) discloses a method and apparatus for indicating the emotional state of a person by the person's speech by: detecting speech waves of the person; subjecting the detected speech waves to backward and forward inverse filtering operation to obtain residual signals; cross-correlating the residual signals to produce a cross-correlated output; integrating with maximum overlapping the backward and forward residual signal, thereby achieving an estimation of the glottal wave; and processing the above glottal wave estimation to provide an indication of the emotional state of the speaker.

Published European Patent Application No. 94850185.3 (Publication No. 06 664 537 A2) describes a method and arrangement for determining stresses in a spoken sequence. From a sequence recognized in the spoken speech, a model of the speech is created. By comparing the spoken sequence with the modeled speech, a difference between them is obtained.

U.S. Pat. No. 1,384,721 describes a method and apparatus for physiological response analysis.

U.S. Pat. No. 3,855,416 to fuller describes a method and apparatus for phonation Analysis leading to valid truth/lie decisions by fundamental speech-energy weighted vibrato component assessment.

U.S. Pat. No. 3,855,417 to fuller describes a method and apparatus for phonation Analysis leading to valid truth/lie decisions by spectral energy comparison.

U.S. Pat. No. 3,855,418 to fuller describes a method and apparatus for phonation Analysis leading to valid truth/lie decisions by vibrato component assessment.

The disclosures of all publications mentioned in the specification and of publications cited therein are hereby incorporated by reference.

SUMMERY OF THE INVENTION

The present invention seeks to provide improved apparatus and methods for monitoring emotional states, such as attention level, sub-conscious emotional reactions, sub-conscious cognitive activity and anticipation level of an individual using a voice analysis of the monitored subject.

There is thus provided in accordance with a preferred embodiment of the present invention, apparatus for monitoring emotional state of an individual, the apparatus including a voice analyzer operative to input a speech specimen generated by the monitored individual and to derive therefrom emotional information regarding the subject's emotional state, and an emotion reporter operative to generate an output indication of that individual's emotional state.

Further in accordance with a preferred embodiment of the present invention, the speech specimens are provided over the telephone to the voice analyzer.

Still further in accordance with a preferred embodiment of the present invention, the report of the subject's emotional state includes a "love detection" report based on the individual's sub-conscious emotional state.

Further in accordance with a preferred embodiment of the present invention, the emotional information contains information pertaining to a specific part of the vocal frequency spectrum of the analyzed specimen.

Still further in accordance with a preferred embodiment of the present invention, the information of each specimen is stored and compared with the rest of the stored information to produce a "Love Level" report.

Further in accordance with a preferred embodiment of the present invention, the spectral information contains 4 regional numerical summaries.

Still further in accordance with a preferred embodiment of the present invention, the frequency spectrum information contains information about the most significant frequency in the selected spectrum.

Still further in accordance with a preferred embodiment of the present invention, the frequency spectrum information contains information about the low frequencies contribution to the voice in the selected spectrum.

Still further in accordance with a preferred embodiment of the present invention, the frequency spectrum information contains information about the high frequencies contribution to the voice in the selected spectrum.

Still further in accordance with a preferred embodiment of the present invention, the frequency spectrum information contains information about the highest frequencies contribution to the voice in the selected spectrum.

Additionally in accordance with a preferred embodiment of the present invention, the information that relates to the most significant frequency includes information about the overall contribution of the most significant frequency to the selected spectrum in percentage.

Also provided in accordance with another preferred embodiment of the present invention, is a mobile system in which the voice specimens of the monitored subject are provided using microphone, and an emotion reporter operative to produce vocal indication of the subject's emotional state as defined herein.

Additionally provided, in accordance with another preferred embodiment of the present invention, is a mobile system in which the voice specimens of the monitored subject are provided using microphone, and an emotion reporter operative to produce visual indication of the subject's emotional state as defined herein.

Additionally provided, in accordance with another preferred embodiment of the present invention, the speech specimens are provided using any kind of microphone.

Additionally provided, in accordance with another preferred embodiment of the present invention, the speech specimens are provided over a network such as the Internet to the voice analyzer.

Additionally provided, in accordance with another preferred embodiment of the present invention, the speech specimens are provided from a tape recorder or any other means of storing vocal information to the voice analyzer.

DEFINITIONS

In the context of the present invention and the accompanying claims by the term movements is meant vibration movements or any other kind of movements of any hardware that the present invention is applied to as a reaction to emotions detection.

In the context of the present invention and the accompanying claims, the term "level" refers to the overall contribution of a specific portion of the spectrum to the global analyzed spectrum of the sound wave.

In the context of the present invention and the accompanying claims by "a CPU having means to retrieve the digitized data and determine the general emotional state" is meant that the CPU uses a memory to store and retrieve data and a software to calculate the general emotional state.

BRIEF DESCRIPTION THE DRAWINGS

The present invention will be understood and appreciated from the following detailed description, taken in conjunction with the drawings in which:

FIG. 2C also displays high Attention level.

Step 10 is an automatic operation, and therefore is not explained using additional flowchart.

Steps 40-50-60-70 are simple mathematical calculation and are explained in FIG. 3 next to the step icon.

Attached herewith is the following appendix, which aid in the understanding and appreciation of one preferred embodiment of the invention shown and described herein:

Appendix A is a computer listing of a preferred and simplified software implementation of a preferred embodiment of the invention shown and described herein.

DETAILED DESCRIPTION OF PREFERRED EMBODIMENTS

A portion of the disclosure of this patent document contains material which is subject to copyright protection. The copyright owner has no objection to the facsimile reproduction by anyone of the patent document or the patent disclosure, as it appears in the patent and trademark office patent file or records, but otherwise reserve all copyright rights whatsoever.

Figure 1:
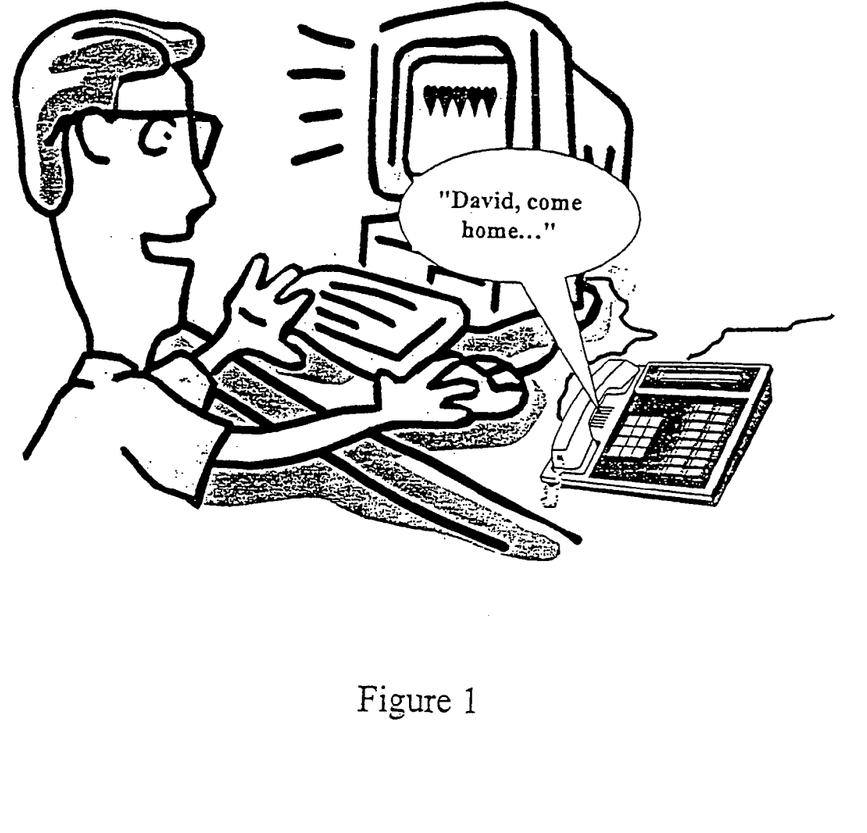
FIG. 1 is a pictorial illustration of a system for on-line monitoring of a speaker emotional state.

FIG. 1 is a pictorial illustration of a system for online monitoring of a speaker's emotional state. As shown, speech input arriving over a telephone line, in the illustrated embodiment, is received by the system. The system analyzes the speech specimen in order to obtain an indication of the speaker's "global emotional state" which indication is preferably provided to the user in real-time, e.g. on the display screen as shown. The speaker's global emotional state will be defined as the analysis results of the sub-conscious emotional state, sub-conscious cognitive state, anticipation level, attention level and the "Love Level" analysis.

Figure 2A:
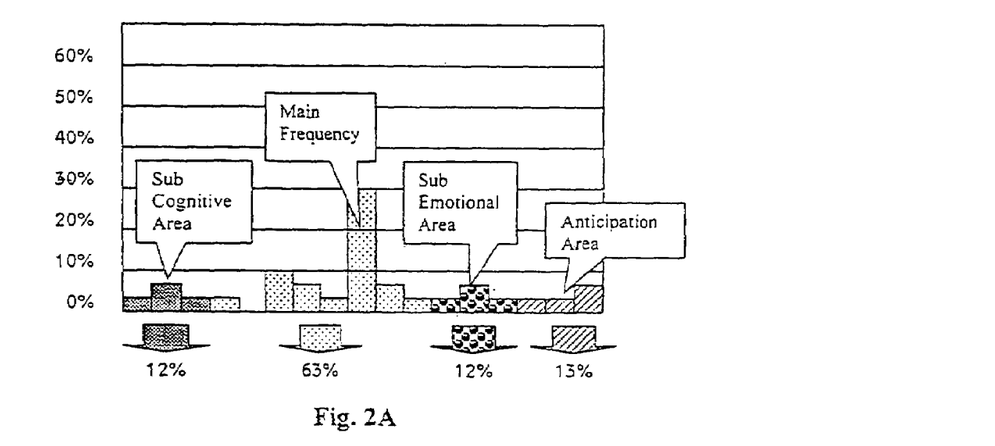
FIG. 2A is a graphic illustration of the selected frequency spectrum divided into the 4 regions from which the information is gathered, and in which no special indication is found.

FIG. 2A is a graphic illustration of a selected 16-frequency spectrum, in terms of contribution to the wave in percentage, divided into 4 predefined regions from which the global emotional state information is gathered. As shown, the cognitive area total sum is 12%, the emotional area total sum is 12%, the anticipation area total sum is 13% and the main frequency contribution is about 30%.

The Main Frequency is defined as the most significant frequency in the analyzed spectrum, and is indicative to the attention level or concentration level. The results of the emotional and cognitive areas may be deemed as normal in the values between 10% and 20% for the displayed preferred embodiment, but it is appreciated that in different types of embodiments different values may be deemed as normal. The anticipation area sum is 13%, which may be deemed indicative to a certain degree of anticipation in the subject's voice, how ever, in this preferred embodiment of the present invention, the displayed anticipation sum is not deemed to be high. The attention level detected using the main frequency (valued 30% in FIG. 2A) is deemed normal for the purposes of the present preferred embodiment.

Figure 2B:
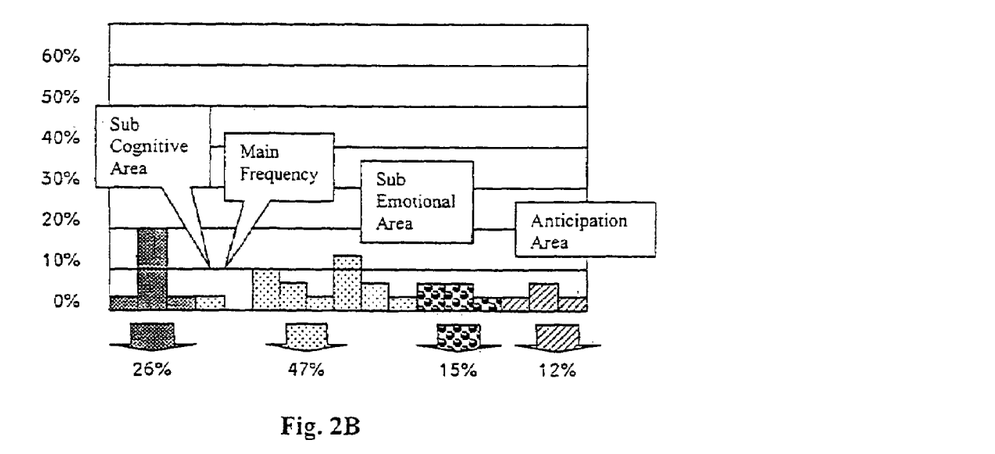
FIG. 2B is a graphic illustration of the selected frequency spectrum divided into the 4 regions from which the information is gathered, and in which high sub conscious cognitive activity can be detected.

FIG. 2B is a graphic illustration of a selected 16-frequency spectrum, in terms of contribution to the wave in percentage, divided into 4 predefined regions from which the global emotional state information is gathered. As shown, the cognitive area total sum is 26% indicating high sub-conscious cognitive reaction for the purposes of the present preferred embodiment, which may be indicative to intensive thinking, inner logical conflict or some cognitive dissonance. The emotional area total sum is 15%, which can be indicative to some emotional reaction, but in general the emotional sum should not be deemed as high. The anticipation area total sum is 12% and the main frequency contribution is about 20%, indicating normal anticipation level and relatively low attention level.

Figure 2C:
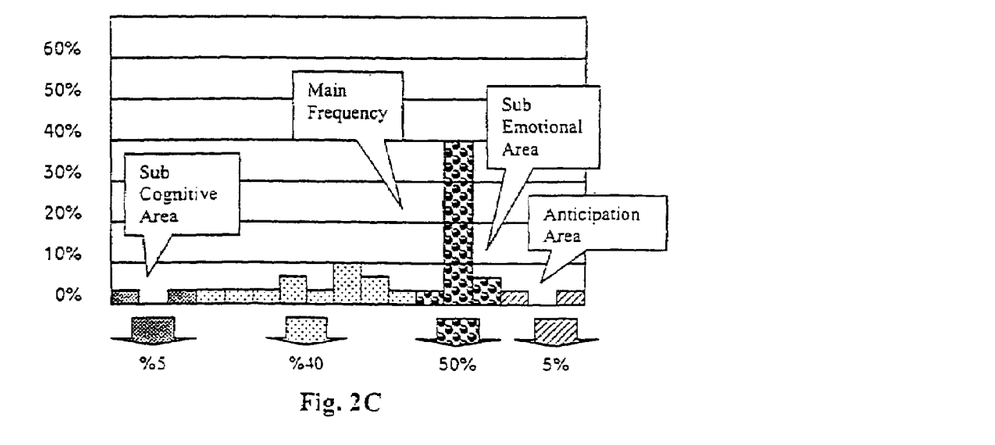
FIG. 2C is a graphic illustration of the selected frequency spectrum divided into the 4 regions from which the information is gathered, and in which high sub conscious emotional reaction can be detected.

FIG. 2C is a graphic illustration of a selected 16-frequency spectrum, in terms of contribution to the wave in percentage, divided into 4 predefined regions from which the global emotional state information is gathered. As shown, the cognitive area total sum is 5% indicating Low sub-conscious cognitive reaction, which may be indicative to poor thinking at the time that the analyzed segment was said or inner consent with no logical problem. The emotional area total sum is 50%, which is deemed as an indication to a very high emotional reaction. The anticipation area total sum is 5% and the main frequency contribution is about 40%, indicating normally low anticipation level and relatively high attention (concentration) level. It is appreciated that all values described are intended for the purposes of the present preferred embodiment, and are not intended to be limiting. In different implementations of the present invention different values may be defined as high, normal or low, and on other implementations it is possible not to include analysis of any kind to the detected values.

Figure 3:
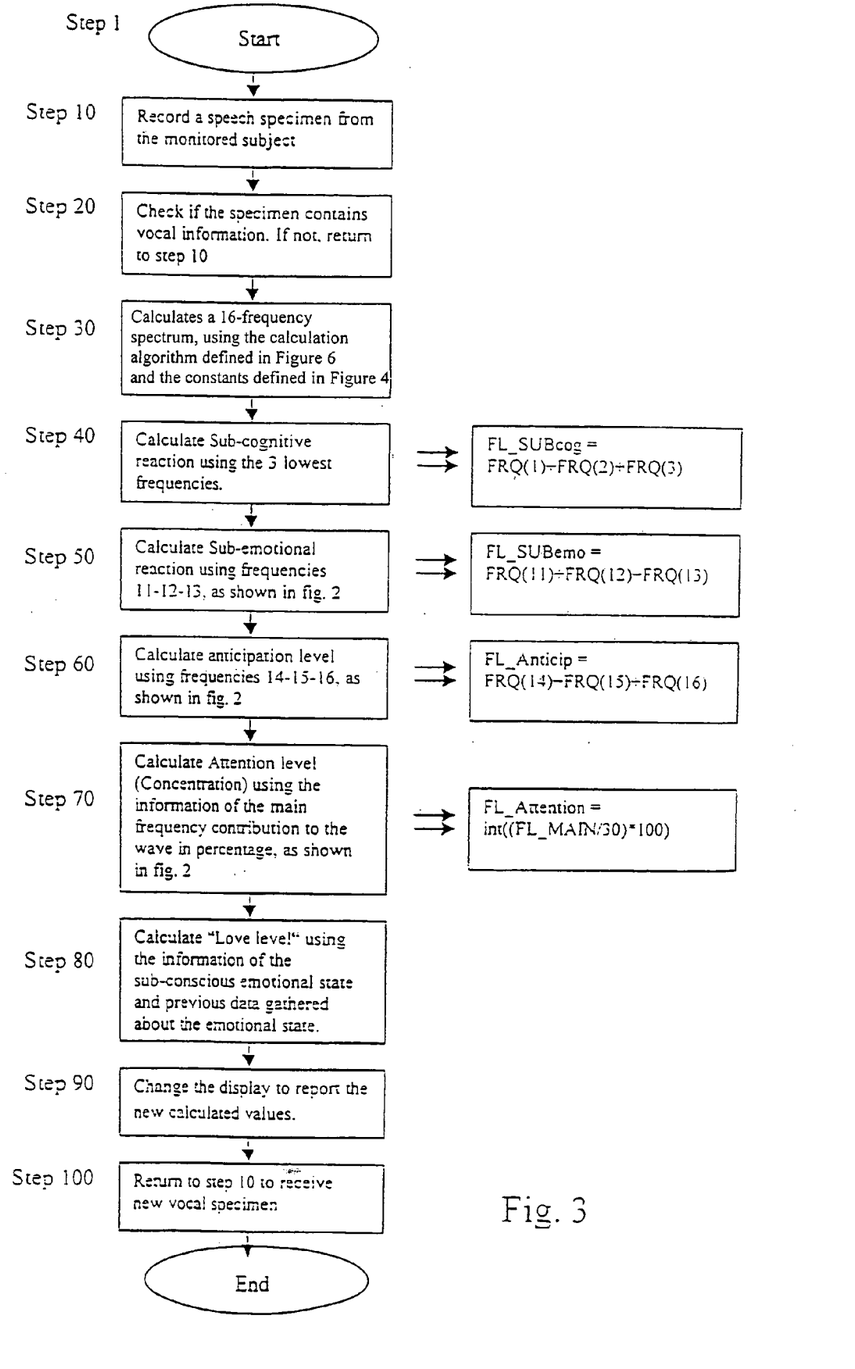
FIG. 3 is a simplified flowchart illustration of a preferred method for online monitoring the subject's emotional state.

FIG. 3 is a simplified flowchart illustration of a preferred method for online monitoring the subject's emotional state. The method of FIG. 3 preferably includes the following steps:

Initialization step 1—Constants are defined such as various thresholds values, define ranges indicative to normal, high and low values and declare variables to be used in this software preferred embodiment and for the purpose of demonstrating the present invention.

Step 10—record and digitize a voice for a predefined period of time. Since this preferred embodiment is for online detection of emotions, the recording process can be automated and continuous, but it is appreciated that for other preferred embodiments of the present invention recording can be made in different ways, for example on manually demand. A suitable period of recording time may be for example 0.5 of a second. In this preferred embodiment the recording process will provide sampled vocal data every 0.5 seconds until the system will be stopped.

Step 20—search the recorded segment for the crucial portion, i.e. the portion of the voice segment that is thought to actually contain human voice information as opposed to background noise or silence. A suitable criterion for the voice information may be amplitude, e.g. the first instance of amplitude which exceeds a threshold is deemed the beginning of the voice information, and the end of the voice information is deemed the point after which no threshold-exceeding sample is found for a predetermined duration. If no crucial portion was found, or the crucial portion contains less then 1224 Samples the system returns to perform step 10. If the crucial portion contains 1224 samples or more, the system continues to step 30.

Figure 4:
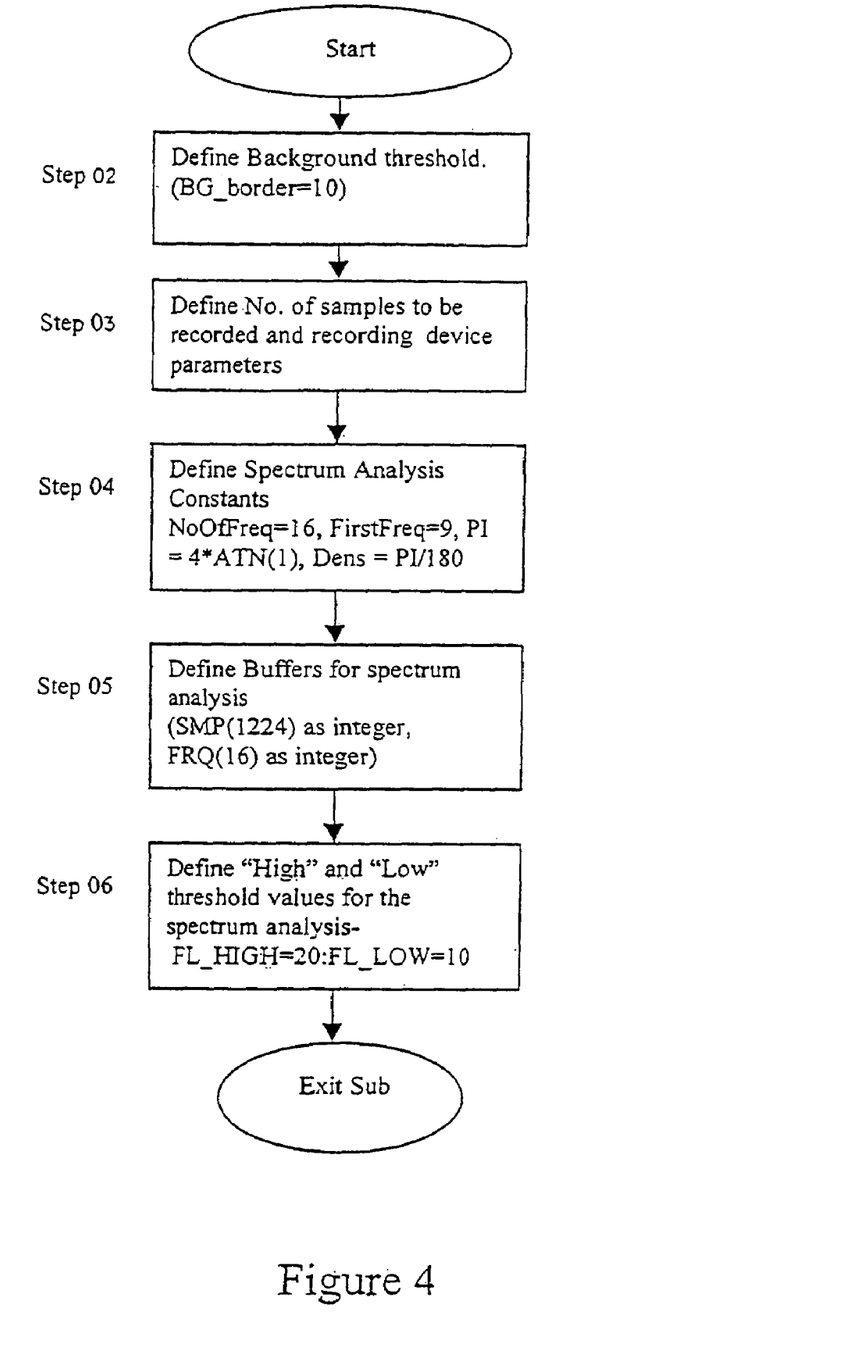
FIG. 4 is a simplified flowchart illustration of a preferred method for performing step 1 of FIG. 3.
Figure 6:
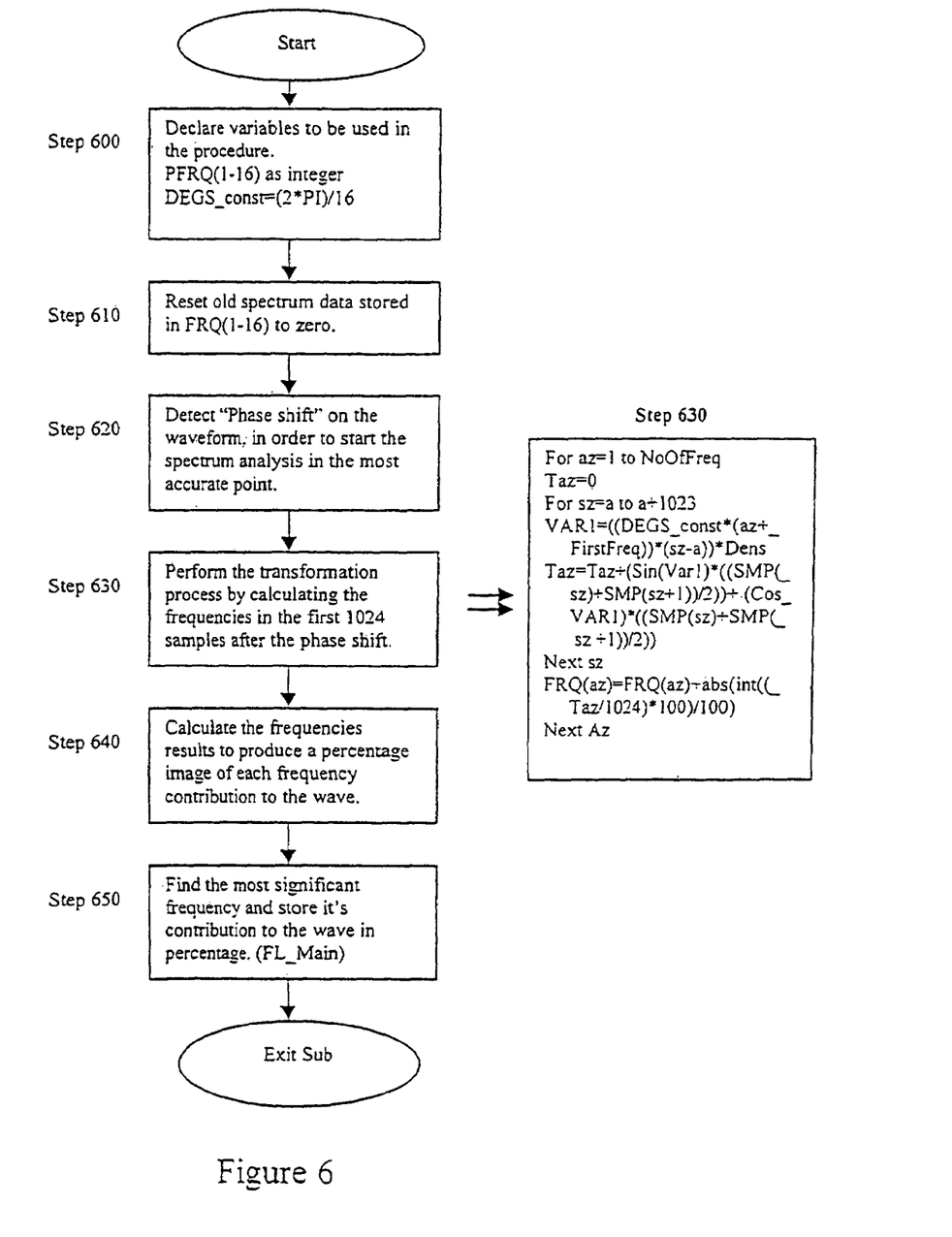
FIG. 6 is a simplified flowchart illustration of a preferred method for performing step 30 of FIG. 3.

Step 30—The system uses the calculation algorithm defined in FIG. 6 and the constants defined in FIG. 4 to calculate a 16-frequency spectrum from the 1024 most suitable samples of the crucial portion of the vocal segment. The system stores the analyzed spectrum amplitudes in the memory FRQ(1–16).

Step 40—calculates the total sum of the 3 lowest frequencies in order to detect the sub-conscious cognitive reaction. The value can be analyzed further in order to define a personal normative analysis, a circumstantial analysis, or any other kind of analysis. The value can be stored and displayed later as a numerical value or as a textual phrase indicating the value, for example: "High" if the value is higher then 20%, "Normal" between 10% and 20% and "Low" if the value is below 10%.

Step 50—calculates the total sum of the frequencies in the emotional area in order to detect the sub-conscious emotional reaction. The value can be analyzed further in order to define a personal normative analysis, a circumstantial analysis, or any other kind of analysis. The value can be stored and displayed later as a numerical value or as a textual phrase indicating the value, for example: "High" if the value is higher then 20%, "Normal" between 10% and 20% and "Low" if the value is below 10%.

Step 60—calculates the total sum of the 3 highest frequencies in order to detect the anticipation level. The value can be analyzed further in order to define a personal normative analysis, a circumstantial analysis, or any other kind of analysis. The value can be stored and displayed later as a numerical value or as a textual phrase indicating the value, for example; "High" if the value is higher then 10%, "Normal" between 5% and 10% and "Low" if the value is below 5%.

Step 70—calculates the attention/concentration level using the information of the Main Frequency. The information of the Main Frequency is in terms of percentage contribution to the wave. The value can be analyzed further in order to define a personal normative analysis, a circumstantial analysis, or any other kind of analysis. The value can be stored and displayed later as a numerical value or as a textual phrase indicating the value, for example; "High" if the value is higher then 40%, "Normal" between 20% and 40% and "Low" if the value is below 20%.

Step 80—in step 80, the up-to-date Love Level will be calculated using the sub-conscious emotional data from the present crucial portion and the previous Love Level. If the present sub-conscious emotional data sum is higher then a predefined set of thresholds then the Love Level should be raised, if it falls from another threshold then the Love Level should be decreased. For example: if the emotional area sum is higher then 30% the Love Level counter should be raised by the value of 0.3. If the emotional area sum is higher then 40% the Love Level counter should be raised additionally by the value of 0.2. If the emotional area sum is higher then 50% the Love Level counter should be raised additionally by the value of 0.3.

Step 90—The calculated results are presented to the user in the preferred way, that may or may not include animation, graphics, sounds, colors, text or any other indication that is suitable for the understanding and appreciation of the results. The results can be displayed on screen, using a printer, or using any kind of audio device.

It is appreciated that the different mathematical techniques can be used in order to produce a spectrum analysis, and the present invention is not necessarily limited to the mathematical calculation or algorithms explained in the preferred embodiment, but reserve the rights for any kind of calculation once or ever on the vocal spectrum in order to analyze the global emotional state or any portion of it as defined above.

It is appreciated that the spectrum analysis need not necessarily be of 16 frequencies as described in the preferred embodiment, but may alternatively be of 15 frequencies or less, or even be higher then 16 frequencies.

It is appreciated that the calculation of the cognitive area need not necessarily be of 3 frequencies as described in the preferred embodiment, but may alternatively be 2 frequencies or less, or even be higher then 3 frequencies, but always relates to the low bound of the analyzed spectrum or any of its mathematically equivalent in the preferred embodiment.

It is appreciated that the calculation of the emotional area need not necessarily be of 3 frequencies as described in the preferred embodiment, but may alternatively be 2 frequencies or less, or even be higher then 3 frequencies, but always relates to the relatively high bound of the analyzed spectrum or any of its mathematically equivalent in the preferred embodiment.

It is appreciated that the calculation of the anticipation area need not necessarily be of 3 frequencies as described in the preferred embodiment, but may alternatively be 2 frequencies or less, or even be higher then 3 frequencies, but should be related to the highest bound of the analyzed spectrum, or any of its mathematically equivalent in the preferred embodiment.

FIG. 4 is a simplified flowchart illustration of a preferred method for performing step 1 of FIG. 3. The method of FIG. 4 preferably includes the following steps:

Step 02—Define the Background level threshold. In this preferred embodiment, the number 10 is an absolute value used to define the minimum amplitude required for detecting the first and final samples of the crucial portion, when 8-bit sampling is applied.

Step 03—initialize the recording device, i.e. the computer's sound card, in order to be suitable for the preferred embodiment operation. The setting can be for example: 11,250 kHz sampling rate, 8 Bit sampling mode, Mono, PCM compression format and 6000 bytes buffer size.

Step 04—Define constants required for the spectrum transform algorithm. The constants are the number of frequencies required as output after the spectrum transform has been completed, the first frequency to be detected and the density of the frequencies. FirstFreq relates to the first frequency to be analyzed, NoOfFreqs relates to the number of frequencies and Dens relates to the distance between the digitized frequencies. Suitable values for these constants may be for example: NoOfreqs=16, FirstFreq=9, The value of PI (3.14~) should be calculated and Dens=PI/180.

Step 05—Define Buffers in the computer memory so the frequencies transform algorithm can work properly. SMP (1224) is the buffer that will hold the first 1224 samples from the digitized crucial portion, and FRQ(16) will be used to store the Frequencies output after each spectrum transform analysis. The spectrum transform analysis is the process in which the digitized samples are analyzed in order to detect the actual frequencies combining the waveform and their contribution in percentage to the waveform.

Step 06—Define thresholds for "High" and "low" analysis. FL_HIGH is a preferred threshold that any emotional, cognitive or anticipation value exceeding the value of FL_HIGH may be deemed high. FL_LOW is a preferred threshold that any emotional, cognitive or anticipation value below this value may be deemed low. Any of the emotional, cognitive or anticipation value between the FL_HIGH and FL_LOW values may be deemed normal or average. It is appreciated that the FL_HIGH and FL_LOW are defined for demonstration only, and may be defined as any other value in correlation with the desired application. It is also appreciated that these values may not even be pre-defined, but can also be defined and/or changed during the application run-time.

Figure 5:
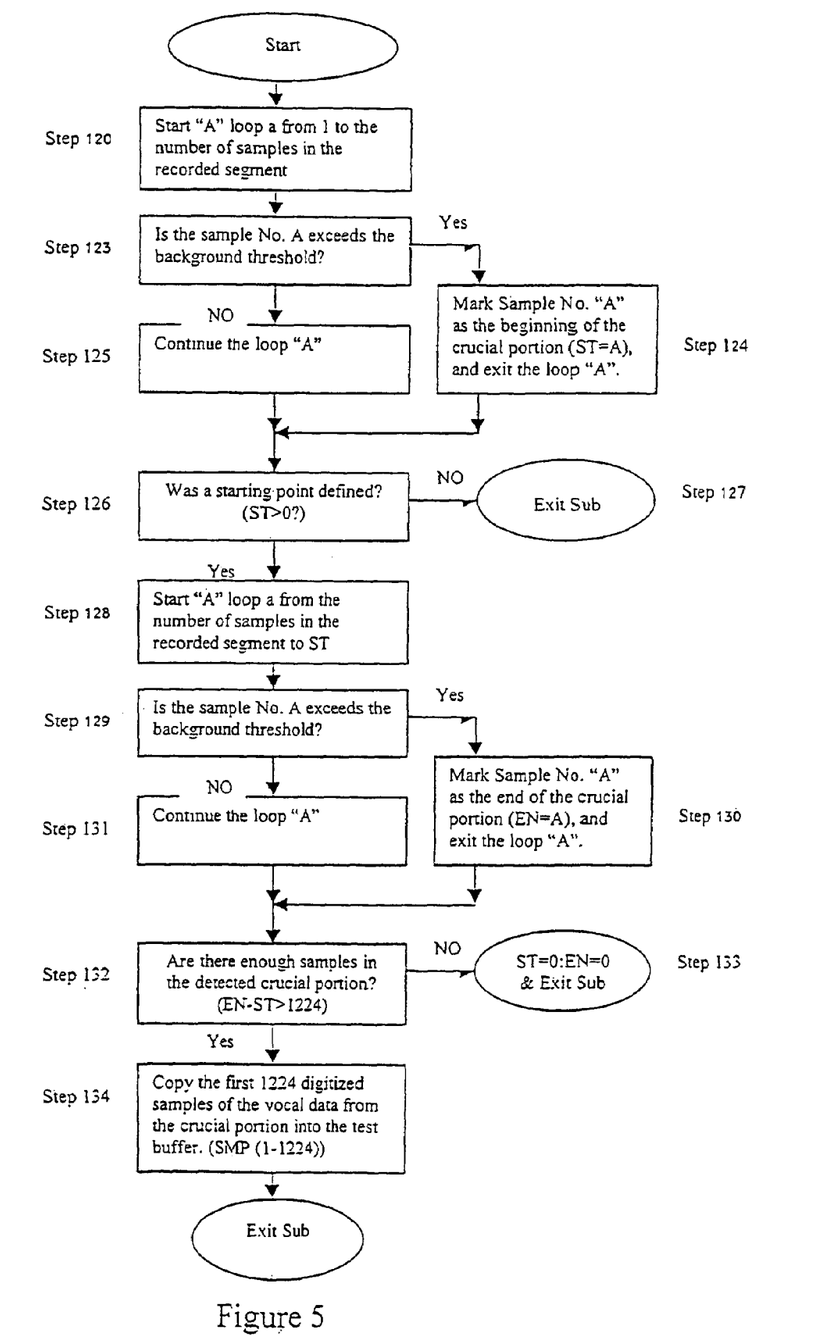
FIG. 5 is a simplified flowchart illustration of a preferred method for performing step 20 of FIG. 3.

FIG. 5 is a simplified flowchart illustration of a preferred method for performing step 20 of FIG. 3. The method of FIG. 5 preferably includes the following steps:

Step 120—start a loop "A" from 1 to the number of samples in the digitized segment of the vocal specimen. The value of the variable 'A' will indicate the sequential No. of the currently analyzed single byte sample.

Step 123—Check the value of sample number 'A', i.e. BUF(A). If the sample amplitude in absolute value is greater then the background threshold, i.e. constant 'BG_Border', the system will continue to step 124, otherwise the system proceed to step 125.

Step 124—if step 124 is reached, the system has successfully detected the first sample of the crucial portion, and variable 'ST' will be set to remember the position of this sample, i.e. 'A'. After performing step 124, the system will terminate the process of loop 'A', and will continue to step 126.

Step 125—if step 125 is reached, the system has not yet detected the crucial portion beginning, and therefore variable 'A' will be increased in 1 and unless 'A' is now equal to the number of samples in the digitized vocal specimen, the system will go back to step 123. However, if 'A' is equal to the number to samples in the digitized vocal specimen, the system will continue to step 126, and the value of variable ST will remain '0'.

Step 126—Check the value of variable 'ST'. If the value is 0 then the system could not detect a beginning for the crucial portion and therefore (Step 127) will return to perform step 10 of FIG. 3. If the value of variable 'ST' is greater then 0, the crucial portion beginning point was detected successfully and the system proceeds to step 128.

Step 128—Start a loop 'A' from the total number of samples in the digitized vocal specimen to the value stored in variable 'ST', i.e. reversed loop.

Step 129—Check the value of sample number 'A', i.e. BUF(A). If the sample amplitude in absolute value is greater then the background threshold, i.e. constant 'BG_Border', the system will continue to step 130, otherwise the system proceeds to step 131.

Step 130—if step 130 is reached, the system has successfully detected the last sample of the crucial portion and variable 'EN' will be set to remember the position of this sample, i.e. 'A'. After performing step 130, the system will terminate the process of loop 'A', and will continue to step 132.

Step 131—if step 131 is reached, the system has not yet detected the crucial portion ending point, and therefore variable 'A' will be decreased in 1 and unless 'A' is now equal to the value of 'ST', the system will go back to step 129. However, if 'A' is equal to the value of 'ST', the system will continue to step 132, and the value of variable EN will remain '0'.

Step 132—Check if the crucial portion is big enough to be analyzed, i.e., preferably contains more then 1224 samples. If the crucial portion is big enough, the system will proceed to step 134, otherwise the system will proceed to step 133, in which the system will return to perform step 10 of FIG. 3.

Step 134—Copy the first 1224 samples of the crucial portion marked by the values of 'ST' and 'EN' into a secondary memory area (buffer) to be analyzed in step 30 of FIG. 3.

It is appreciated that any other technique for isolating the crucial portion from the vocal specimen can be applied, and even no process of such isolation can be applied in different applications and preferred embodiments of the present invention.

FIG. 6 is a simplified flowchart illustration of a preferred method for performing step 30 of FIG. 3. The method of FIG. 6 preferably includes the following steps:

Step 600—if the system reaches step 600 then SMP (1–1224) buffer is filled with suitable digitized data to be analyzed. In step 600 an additional temporary memory area will be defined, i.e. PFRQ(1–16) to hold temporary values of the analysis process and the variable "DEGS_const" will be calculated to simplify the analysis process.

Step 610—the previous results of the calculation will be reset to zero, i.e. FRQ(1–16)=0

Step 620—scan the crucial portion samples to detect the first instance that a phase-shift occurred, i.e. the first instance that a negative amplitude sample was followed by a positive or zero amplitude sample, or vice-versa. Once such condition was complied, the system moves to step 630.

Step 630—in this step, a mathematical algorithm will be applied on the samples to produce a specific set of frequencies suitable for the operation of this preferred embodiment. In this preferred embodiment of the present invention, a set of 1024 samples will return 16 frequencies most suitable for detecting the global emotional state. The mathematical algorithm is best explained in the software illustration of FIG. 6 titled "Step 630" (Taz iz a service variable, Sz is the number of the sample, Az is the number of the frequency).

Step 640—the results will be computed to produce a percentage "image" description of each frequency contribution to the wave form, for example: if the total sum of all the frequencies amplitude in absolute values of step 630 is "200", and the first frequency, (i.e. FRQ(1)) value is 10, then the percentage image of this frequency will be 5%.

Step 650—the system will find the highest single frequency in the percentage image of the frequencies, and the value of it will be stored in the variable "FL_Main".

It is appreciated that any other technique for analyzing the spectrum structure of the crucial portion can be applied in different applications and preferred embodiments of the present invention.

It is appreciated that any other range of the spectrum structure of the crucial portion can be used in different applications and preferred embodiments of the present invention, in conjunction with the sound card setting or the Analog to Digital converter operation.

Figure 7:
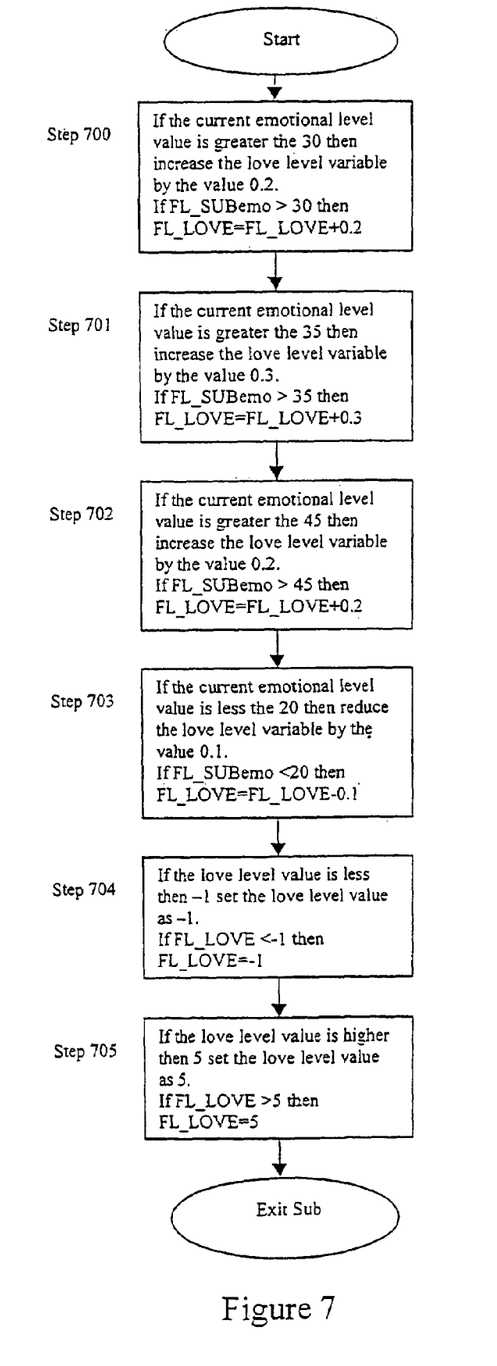
FIG. 7 is a simplified flowchart illustration of a preferred method for performing step 80 of FIG. 3.

FIG. 7 is a simplified flowchart illustration of a preferred method for performing step 80 of FIG. 3. The method of FIG. 7 preferably includes the following steps:

Step 700—if the value of the current emotional level, previously calculated in step 50 and named for the purpose of this preferred embodiment as 'FL_SUBemo', is greater then the preferred value '30', add 0.2 to the 'Love Level' indicator.

Step 701—if the value of the current emotional level is still greater then the preferred value '35', add additional 0.3 to the 'Love Level' indicator, so that after performing steps 700–701, if the current emotional level was higher then 35, the 'Love Level' indicator will be increased by 0.5.

Step 702—if the value of the current emotional level is still greater then the preferred value '45', add additional 0.2 to the 'Love Level' indicator, so that after performing steps 700–702, if the current emotional level was higher then 45, the 'Love Level' indicator will be increased by 0.7.

Step 703—if the value of the current emotional level is lower then the preferred value '20', reduce the 'Love Level' indicator by 0.2.

Step 704—if the value of the "Love Level" indicator is smaller then preferred value (−1) then set the value of the "Love Level" indicator as (−1). The value (−1) was preferably selected to indicate the minimum level of the "Love Level" variable for the purposes of this preferred embodiment.

Step 705—if the value of the "Love Level" indicator is higher then the preferred value 5, then set the value of the "Love Level" indicator as 5. The value 5 was preferably selected to indicate the maximum level of the "Love Level" variable for the purposes of this preferred embodiment.

It is appreciated that any other technique for analyzing the 'Love Level' using the sub conscious emotional level can be applied in different applications and preferred embodiments of the present invention.

Figure 8:
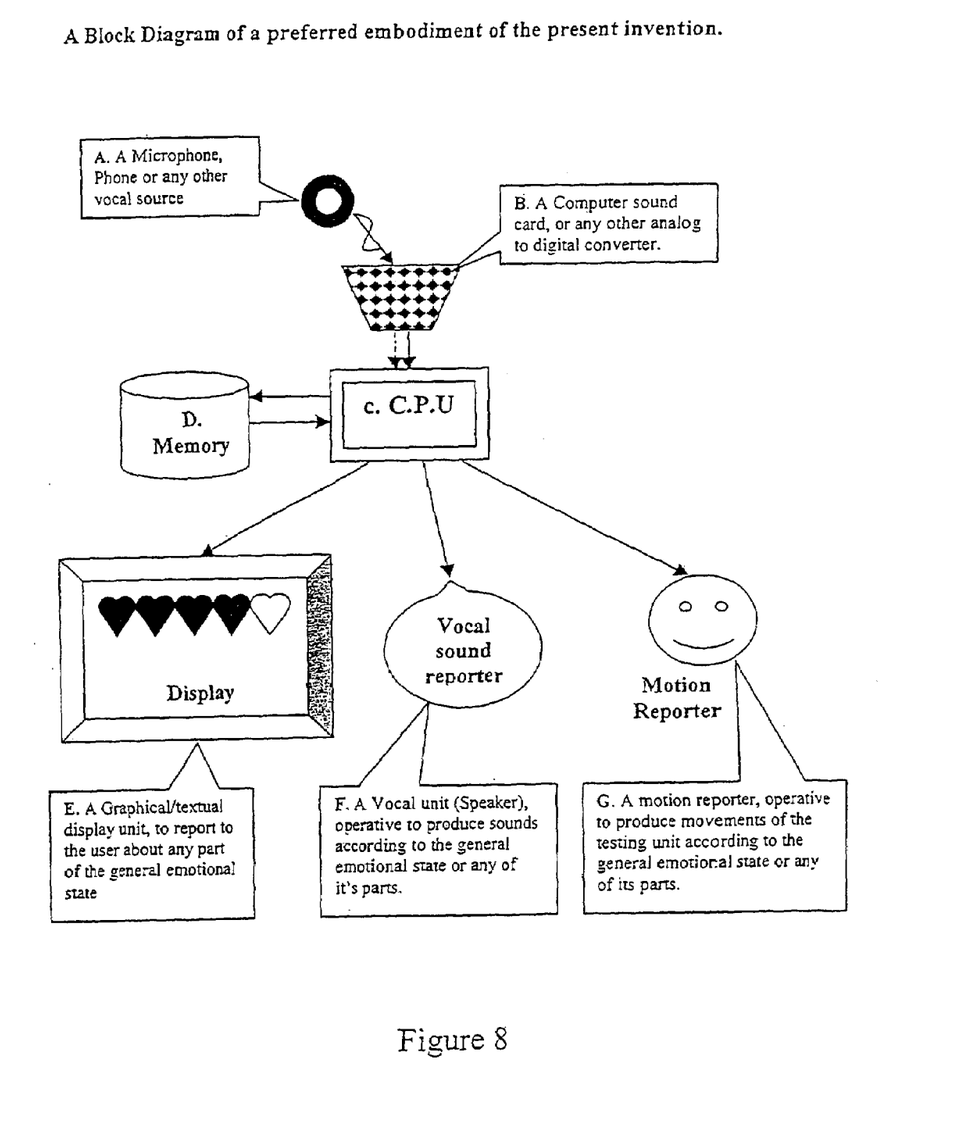
FIG. 8 is a block diagram of the preferred embodiment.

FIG. 8 is a simplified functional block diagram illustration of a system which is constructed and operative in accordance to the preferred embodiment of the present invention and which is operative to perform all the present invention capabilities.

As shown on FIG. 8, a voice specimen is gathered from a microphone, phone or any other vocal source (a), and transmitted in analog form into a sound-card or Analog-Digital converter (b). The digitized data is then send into a C.P.U (c) previously loaded with the preferred embodiment software. The CPU will use the Memory (d) to store and retrieve data, and will calculate the global emotional state of the individual during the time of speak. The CPU will then produce an indication of the Global Emotional State to the Display Unit (e) using graphics, symbols or text. The CPU can also produce a vocal indication using a speaker (f), or in other preferred embodiments a visual movement of a portable unit may also be applied (g).

It is appreciated that in different embodiments of the present invention additional units may be applied, and on other preferred embodiments some components may be removed or left unused.

Figure 9A:
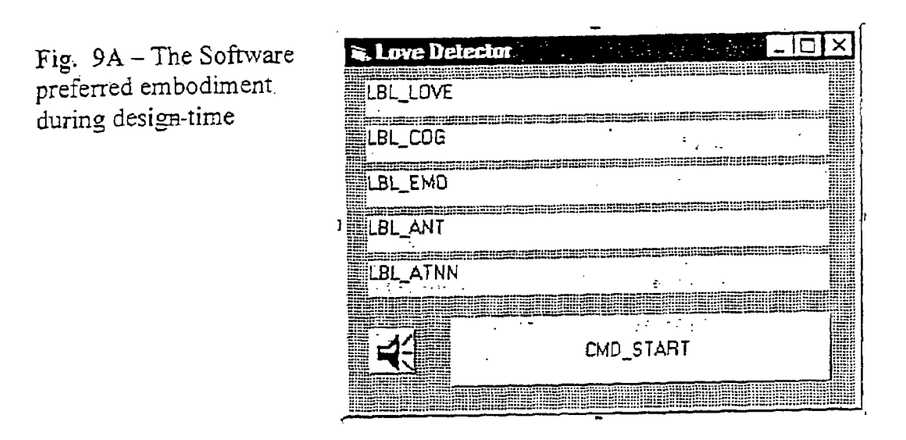
FIG. 9A is a graphic illustration of the preferred software embodiment of appendix A display in the designing environment during design time.

FIG. 9A is a screen display of the software implementation of the preferred embodiment described in appendix A in design time. As shown in the display, the operative object (the fulldplx.ocx) is located on the form. This unit will be used to perform the sampling and digitizing of the voice specimens. Other Label components are set to report textually the subject's global emotional state, and a Command button is placed on the form to be operative to start and stop the analysis process.

Figure 9B:
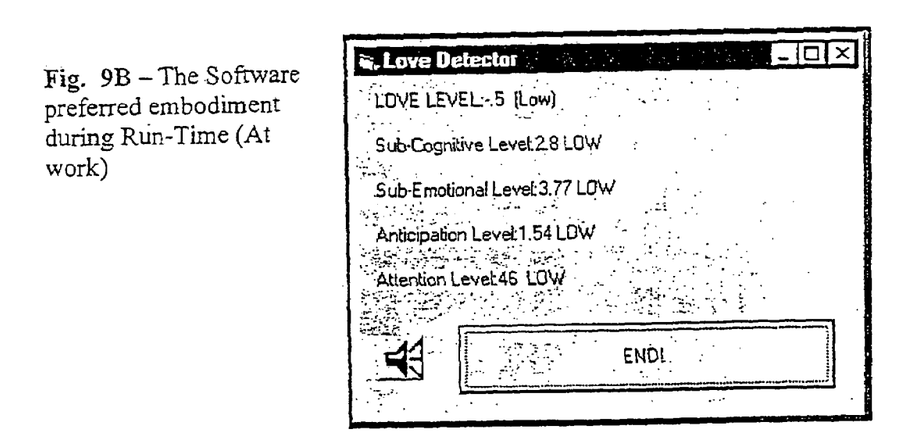
FIG. 9B is a graphic illustration of the preferred software embodiment of appendix A display while performing the emotion detection during run time.

FIG. 9B is a screen display of the software implementation of the preferred embodiment during run-time while performing analysis. As displayed, the subject's Love Level is low aid valued −0.5, the subject's current sub-cognitive activity is valued 2.8 and deemed as low, the sub-conscious emotional level is valued 3.77 and deemed low, the anticipation level is valued 1.54 and deemed low, and the attention level is 46% from normal behavior and deemed low as well.

In the illustrated embodiment of appendix "A", the term "FL_SUBemo" is used to describe the currently detected sub-conscious emotional level. For example, if the value of "FL_SUBemo" is greater then 30, it may be deemed as high emotional level and may be indicative, if repeated frequently, to high "Love Level", sexual arousal or general excitement.

In the illustrated embodiment, the term "FL_SUBcog" is used to describe the currently detected sub-conscious cognitive level. For example, if the value of "FL_SUBcog" is greater then 30, it may be deemed as high cognitive level, indicative to intensive thinking, logical conflict or cognitive dissonance.

In the illustrated embodiment, the term "FL_Anticip" is used to describe the currently detected anticipation level. For example, if the value of "FL_Anticip" is greater then 20, it may be deemed as high anticipation level, and an indication, for example, that the subject is expecting something to happen.

In the illustrated embodiment, the term "FL_Attention" is used to describe the currently detected Attention level in percentage. The value of "FL_Attention" is calculated using the variable "FL_Main" value divided in the preferred value "30" and multiplied by 100 to produce a suitable normalized value in percentage. For example, if the value of "FL_Attention" is greater then 140%, it may be deemed as high Attention level, indicative to high concentration and high attention. If the value is less then 70%, the subject is in low attention mode, or may be even in psychological denial.

In the illustrated embodiment, the term "FL_LOVE" is used to describe the calculated "Love Level". For example, if the value of "FL_LOVE" is greater then 3, it may be deemed indicative to love feelings of the subject.

It is appreciated that all of the numerical values are merely examples and are typically application-dependent.

Appendix A is a computer listing of software implementation of the preferred embodiment of the present invention.

A suitable method for generating the software implementation of Appendix A is as follows:

a. On a computer equipped with a sound card and Windows 95 install Visual Basic 5 or 6.
b. Install a "FullDuplex.OCX" software component to enable quick and easy access to the sound card features.
c. Set the Windows 95 mixer to receive maximum amplitude from the microphone and enable it's entry to record from the microphone.
d. Start Microsoft Visual Basic designing environment.
e. Generate a new project, and name it "Love_Detector")
f. On Form1, add a label object and set its name to "LBL_LOVE"
g. On Form1, add a new label object and set its name to "LBL_COG"
h. On Form1, add a new label object and set its name to "LBL_EMO"
i. On Form1, add a new label object and set its name to "LBL_ANT"
j. On Form1, add a new label object and set its name to "LBL_ATTEN"
k. On Form1, add a FULLDPLX object. The name property will be automatically set to "FullDplx1".
l. On Form1, add a Button object and set its name to "CMD_START"
m. Set the system to enable code entering and type in the code of appendix A.
n. Once the process is completed, it is possible to activate the application using the "Visual Basic" RUN command.

It is appreciated that the software components of the present invention may, if desired, be implemented in ROM (read-only memory) form. The software components may, generally, be implemented in hardware, if desired, using conventional techniques.

It is appreciated that the particular embodiment described in appendix A is intended only to provide an extremely detailed disclosure of the present invention and is not intended to be limiting.

It is appreciated that various features of the invention which are, for clarity, described in the contexts of separate embodiments mat also be provided in combination in a single embodiment. Conversely, various features of the invention which are, for brevity, described in the context of a single embodiment mat also be provided separately or in any suitable sub-combination.

It will be appreciated by a persons of skills in the art that the present invention is not limited to what has been particularly shown and described herein above. Rather, the scope of the present invention is defined only by the claims that follow.

---

Appendix A-
A computer software implementation of the preferred embodiment

```
Dim BG_border As integer
Dim NoOfFreq As Integer
Dim FirstFreq As Integer
Dim Dens As Double
Dim SMP( ) As Integer, FRQ( ) As Single
Dim BUF( ) As Byte
Dim FL_HIGH As Integer, FL_LOW As Integer
Dim PI, CONST_DEGS1, OFFset
Dim FL_main, FL_LOVE
Dim ST As Integer, EN As Integer
Private Sub CMD_START_Click( )
If CMD_START.Caption = "Start" Then
    CMD_START.Caption = "END"
'       start digitizing data from the soundcard (step 10)
    FullDplx1.WaveInRecord
        Else
    CMD_START.Caption = "Start"
'       stop digitizing and close sound card
    FullDplx1.WaveInStop
    FullDplx1.WaveInClose
    End If
End Sub
Private Sub Form_Load( )
'Start routine - define consts
'       step 02
    BG_border = 10
'       step 03
    FullDplx1.WaveInBitsPerSample = 8
    FullDplx1.WaveInBufferSize = 6000
    FullDplx1.WaveInChannels = 1
    FullDplx1.WaveInSamplesPerSecond = 11025
```

Appendix A-
A computer software implementation of the preferred embodiment

```
'       step 04
    NoOfFreq = 16
    FirstFreq = 9
    PI = 4 * Atn(1) ' Calculate PI.
    Dens = (PI)/180
'       step 05
    ReDim SMP(1224)
    ReDim FRQ(16)
'       step 06
    FL_HIGH = 20
    FL_LOW = 10
    CMD_START.Caption = "Start"
'       Wait for CMD_START to be pressed inorder to start step 10 of FIG. 3
End Sub
Private Sub Step20A(BytesRecorded As Long)
ST = 0: EN = 0
TOT = 0
For a = 0 To BytesRecorded - 1 ' step 120
If Abs(BUF(a) - 128 - OFFset) > BG_border Then ' step 123
'       step 124
    ST = a
    Exit For
    End If
TOT = TOT + (BUF(a) - 128)
Next a 'step 125
If ST = 0 Then
'       OFFset is used to calibrate the soundcard offset
    If OFFset = 0 Then OFFset = TOT\BytesRecorded
    Exit Sub ' step 128
    End If
For a = BytesRecorded - 1 To ST Step -1 ' step 128
If Abs(BUF(a) - 128 - OFFset) > BG_border Then ' step 129
'       step 130
    EN = a
    Exit For
    End If
Next a ' step 131
If EN - ST < 1224 Then ' step 132
'       step 133
    ST = 0: EN = 0
    Exit Sub
    Else
'       step 134
    For a = ST To ST + 1223
    SMP(a - ST + 1) = BUF(a) - 128 - OFFset
    Next a
    End If
End Sub
Private Sub STEP300
    Dim PFRQ(16) As Integer    'temporary area
    DEGS_const = (2 * PI)/16
****************'    Phase 1 - break Spectrum********************
    On Error Resume Next
'       Clear Old Spectrum Data
    For az = 1 To NoOfFreq
    FRQ(az) = 0
    Next az
'       Detect Phase Shift (from Negative to Positive or vise versa)
    For a = 1 To 200
    If SMP(a) >= 0 And SMP(a + 1) < 0 Then Exit For
    If SMP(a) <= 0 And SMP(a + 1) > 0 Then Exit For
    Next a
'       start transform
    For az = 1 To NoOfFreq
    Taz = 0
    For sz = a To a + 1023
    VAR1 = ((DEGS_const * (az + FirstFreq)) * (sz - a)) * Dens
    Taz = Taz + (Sln(VAR1) * ((SMP(sz) + SMP(sz + 1))/2)) + (Cos(VAR1) * ((SMP(sz) + _
            SMP(sz + 1))/2))
    Next sz
    FRQ(az) = FRQ(az) + Abs(int((Taz/1024) * 100)/100)
    Next az
***********    'PHASE 2 - CALCULATIONS ON RESAULTS********************
    maxFRQ = 0
    F_mfrq = 0
```

Appendix A-
A computer software implementation of the preferred embodiment

```
'       FIND TOTAL VALUE OF ALL THE FREQ'S
    total = 0
    For a = 1 To NoOfFreq
    total = total + FRQ(a)
    Next a
    For a = 1 To NoOfFreq
    PFRQ(a) = Int((FRQ(a)/(total) * 100000)/1000
'       find largest FRQ in units
    If F_mfrq < PFRQ(a) Then
        FL_main = PFRQ(a)
        F_mfrq = PFRQ(a)
        End If
    Next a
'       return the CR_FRQ(x) to FRQ(x)
End Sub
Private Sub FullDplx1_WaveInBufferReady(ByVal BytesRecorded As Long)
'Main routin
    ReDim BUF(BytesRecorded)
'       get data from sound card (End of step 10)
    BUF = FullDplx1.WaveInGetBuffer
'       perform step 20
    Call Step20A(BytesRecorded)
    If ST = 0 Or EN = 0 Then Exit Sub ' return to step 10
'       perform step 30
    Call STEP30
'       Step 40
    FL_SUBcog = FRQ(1) + FRQ(2) + FRQ(3)
'       Step 60
    FL_SUBemo = FRQ(11) + FRQ(12) + FRQ(13)
'       Step 60
    FL_anticp = FRQ(14) + FRQ(15) + FRQ(16)
'       Step 70
    FL_Attention = Int((FL_main/30) * 100)
'       step 80
'           step 800
            If FL_SUBemo > 30 Then FL_LOVE = FL_LOVE + 0.2
'           step 801
            If FL_SUBemo > 35 Then FL_LOVE = FL_LOVE + 0.3
'           step 802
            If FL_SUBemo > 45 Then FL_LOVE = FL_LOVE + 0.2
'           step 803
            If FL_SUBemo < 20 Then FL_LOVE = FL_LOVE - 0.1
'           step 804
            If FL_LOVE < -1 Then FL_LOVE = -1
'           step 805
            If FL_LOVE > 5 Then FL_LOVE = 5
'       Step 90
    msgLove = "(Low)"
    If FL_LOVE > 1 Then msgLove = "(Middle)"
    If FL_LOVE > 3 Then msgLove = "(High)"
    For a = 1 To FL_LOVE
    msgLove = "*" + msgLove
    Next a
    LBL_LOVE.Caption = "LOVE LEVEL:" + Format(FL_LOVE) + "" + msgLove
    MSGcog = "Normal"
    If FL_SUBcog < FL_LOW Then MSGcog = "LOW"
    If FL_SUBcog > FL_HIGH Then MSGcog = "HIGH"
    LBL_COG.Caption = "Sub-Cognitive Level:" + Format(FL_SUBcog) + "" + MSGcog
    MSGemo = "Normal"
    If FL_SUBemo < FL_LOW Then MSGemo = "LOW"
    If FL_SUBemo > FL_HIGH Then MSGemo = "HIGH"
    LBL_EMO.Caption = "Sub-Emotional Level:" + Format(FL_SUBemo) + "" + MSGemo
    MSGant = "Normal"
    If FL_anticp < FL_LOW Then MSGant = "LOW"
    If FL_anticp > FL_HIGH Then MSGant = "HIGH"
    LBL_ANT.Caption = "Anticipation Level:" + Format(FL_anticp) + "" + MSGant
    MSGatn = "Normal"
    If FL_Attention < 70 Then MSGatn = "LOW"
    If FL_Attention > 130 Then MSGatn = "HIGH"
    LBL_ATNN.Caption = "Attention Level:" + Format(FL_Attention) + "" + MSGatn
'       step 100 - let the sub end and return to step 10
End Sub
```

The invention claimed is:

1. Apparatus for detecting unconscious general emotions of an individual, the apparatus comprising
    (a) a vocal source input;
    (b) an analog to digital converter operative to perform a digitization process of an analog audio vocal segment received from the individual via the vocal source input;
    (c) a central processing unit (CPU) configured to retrieve digitized data provided by the analog to digital converter and determine a general emotional state of the individual; and
    (d) a general emotion reporter, operative to produce an indication of any kind of the general emotions being part of the general emotional state determined by the CPU;
    wherein said CPU determines the general emotional state of the individual by calculating a spectrum of a predetermined number of frequencies from a plurality of suitable samples of a portion of the vocal segment, and analyzing the spectrum of the vocal segment to obtain an indication of the individual's general emotions according to the digitized data, using at least one of the following:
    (a) a most significant frequency of the spectrum;
    (ii) a total sum of at least one of lowest analyzed frequencies;
    (iii) a total sum of at least one of frequencies in a relatively high bound of the spectrum;
    (iv) a total sum of at least one of highest analyzed frequencies; and
    (v) a percentage contribution of the most significant frequency to the spectrum.

2. Apparatus according to claim 1 wherein said general emotions comprising Sub-Conscious Cognitive Activity level.

3. Apparatus according to claim 2 wherein said Sub-Conscious Cognitive Activity level is detected using spectrum analysis.

4. Apparatus according to claim 1 wherein said general emotions comprising Sub-Conscious Emotional Activity level.

5. Apparatus according to claim 1 wherein said general emotions comprising Anticipation level.

6. Apparatus according to claim 5 wherein said Anticipation level is detected using spectrum analysis.

7. Apparatus according to claim 1 wherein said general emotions comprising Attention level.

8. Apparatus according to claim 1 wherein said general emotions are gathered and analyzed to produce a "Love Report".

9. Apparatus according to claim 1 wherein said general emotions are gathered and analyzed to produce an indication of the subject's sexual arousal level.

10. Apparatus according to claim 1 wherein said general emotion reporter is adapted to present the indication using a visual display.

11. The apparatus according to claim 10, wherein said visual display comprises any one of a screen, a textual display and a graphical display.

12. Apparatus according to claim 1 wherein said general emotion reporter is adapted to present the indication using sounds.

13. Apparatus according to claim 1, further comprising means for producing movements of an object in response to the determined general emotional state.

14. Apparatus according to claim 1 wherein said vocal source input comprises at least one of a phone or a phone line.

15. Apparatus according to claim 1 wherein said vocal source input comprises a microphone.

16. Apparatus according to claim 1 wherein said vocal source input comprises a network interface.

17. Apparatus according to claim 1 wherein the vocal spectrum is calculated and/or analyzed using the value of "Dens" constant or any mathematical equivalent thereof, where Dens=Pi/180.

18. A method of detecting unconscious general emotions of an individual, the method comprising:
    (a) receiving analog vocal data;
    (b) obtaining digitized data by digitization of an analog audio vocal segment being part of the analog vocal data;
    (c) based on the digitized data, determining a general emotional state of the individual; and
    (d) producing an indication of any kind of the general emotions being part of the determined general emotional state;
    wherein said determining comprises:
    calculating a spectrum of a predetermined number of frequencies from a plurality of suitable samples of a portion of the digitized data; and
    analyzing the spectrum of the vocal segment for obtaining an indication of the individual's general emotions using at least one of the following:
    (i) a most significant frequency of the spectrum;
    (ii) a total sum of at least one of lowest analyzed frequencies;
    (iii) a total sum of at least one of frequencies in a relatively high bound of the spectrum;
    (iv) a total sum of at least one of highest analyzed frequencies; and
    (v) a percentage contribution of the most significant frequency to the spectrum.

* * * * *